(12) United States Patent
Brunner et al.

(10) Patent No.: US 9,303,675 B2
(45) Date of Patent: Apr. 5, 2016

(54) BOLT, METHOD AND BOLT ARRANGEMENT FOR FASTENING A COMPONENT TO A BASE MATERIAL

(71) Applicant: Dr. Ing. h.c. F. Porsche Aktiengesellschaft, Stuttgart (DE)

(72) Inventors: Markus Brunner, Sachsenheim (DE); Thiemo Erb, Stuttgart (DE); Erik Samel, Stuttgart (DE); Lars Kuehlborn, Ludwigsburg (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 310 days.

(21) Appl. No.: 14/024,689

(22) Filed: Sep. 12, 2013

(65) Prior Publication Data

US 2014/0079507 A1 Mar. 20, 2014

(30) Foreign Application Priority Data

Sep. 18, 2012 (DE) .................. 10 2012 108 734

(51) Int. Cl.
| | |
|---|---|
| *F16B 39/02* | (2006.01) |
| *F16B 35/06* | (2006.01) |
| *F16B 11/00* | (2006.01) |
| *F16B 37/04* | (2006.01) |
| *F16B 13/14* | (2006.01) |

(52) U.S. Cl.
CPC ............... *F16B 35/06* (2013.01); *F16B 11/006* (2013.01); *F16B 37/048* (2013.01); *F16B 39/021* (2013.01); *F16B 13/141* (2013.01)

(58) Field of Classification Search
CPC ...... F16B 13/141; F16B 37/048; F16B 39/02; F16B 39/021
USPC .................... 411/82, 388, 389, 411, 424, 908
See application file for complete search history.

(56) References Cited

U.S. PATENT DOCUMENTS

| | | | | |
|---|---|---|---|---|
| 3,455,198 A | * | 7/1969 | Barrett | F16B 5/0275 411/107 |
| 3,897,713 A | | 8/1975 | Gugle | |
| 4,157,674 A | * | 6/1979 | Carlson | F16B 5/0275 411/324 |
| 4,223,585 A | * | 9/1980 | Barth | F16B 23/0076 411/386 |
| 4,334,815 A | * | 6/1982 | Knohl | F16B 35/007 411/368 |
| 5,536,344 A | * | 7/1996 | van Dreumel | B29C 65/0672 156/257 |
| 6,520,704 B1 | | 2/2003 | Vidmar et al. | |
| 6,918,727 B2 | * | 7/2005 | Huang | F16B 5/0275 411/107 |
| 7,004,699 B2 | * | 2/2006 | Petrok | F16B 5/02 411/366.1 |
| 7,905,698 B2 | * | 3/2011 | Liu | B25B 13/08 411/388 |
| 2003/0147714 A1 | * | 8/2003 | Yu | F16B 11/006 411/82 |
| 2007/0234614 A1 | | 10/2007 | Tarter et al. | |

FOREIGN PATENT DOCUMENTS

| | | |
|---|---|---|
| DE | 2107032 | 9/1972 |
| DE | 9404442 | 6/1994 |
| GB | 1382655 | 2/1975 |

* cited by examiner

*Primary Examiner* — Roberta Delisle
(74) *Attorney, Agent, or Firm* — Gerald E. Hespos; Michael J. Porco; Matthew T. Hespos

(57) ABSTRACT

A bolt 10 is provided for fastening a component to a base material 20. The bolt has a flange 12 for supporting the component, a first pin 14 is formed on a first side of the flange 12 and is provided with a thread. A second pin 16 is formed on a second side of the flange 12. The second pin 16 is suitable to be fitted into a bore 21 formed in the base material 20 and is secured by a plug-in adhesive connection into the bore 21 formed in the base material 20.

12 Claims, 1 Drawing Sheet

BOLT, METHOD AND BOLT ARRANGEMENT FOR FASTENING A COMPONENT TO A BASE MATERIAL

CROSS REFERENCE TO RELATED APPLICATION

This application claims priority under 35 USC 119 to German Patent Appl. No. 10 2012 108 734.2 filed on Sep. 18, 2012, the entire disclosure of which is incorporated herein by reference.

BACKGROUND

1. Field of the Invention

The invention relates to a bolt, a method and a bolt arrangement for fastening a component to a base material.

2. Description of the Related Art

Many types of bolts are used in automobile manufacturing for fastening a component to a base material. For example, welding bolts may be used if the base material is a steel or aluminum sheet. Such a welding bolt is placed onto a surface of the sheet and is welded to the sheet at a flange.

Adhesive bolts may be used if the base material is formed by a carbon-fiber-reinforced plastic. The adhesive bolt is positioned on the base material by a template that is placed on by hand by a user. The bolt subsequently is bonded adhesively to the base material by a bolt-gluing apparatus. The bolt-gluing apparatus has to be kept in position by the user during the setting time so that the bolt does not swim or float.

Objects of the invention are to provide an improved bolt, an improved method and an improved bolt arrangement for fastening a component to a base material with a reduced setting time per bolt, more accurate positioning of the bolt and improved load-bearing capacity of the bolt for fastening a component to a base material.

SUMMARY OF THE INVENTION

The invention provides a bolt for fastening a component to a base material. The bolt has a flange for supporting the component. A first pin is formed on a first side of the flange and is provided with a thread, and a second pin is formed on a second side of the flange. Fastening connections other than threads can be provided, such as, mushroom shapes or slotted clamps. The second pin is suitable to be fit into a bore formed in the base material, and specifically can be fit by a plug-in adhesive connection into the bore formed in the base material.

Forming a bore in the base material permits more accurate positioning of the bolt on the base material, as compared to the prior art template. The second pin on the second side of the flange is secured in the bore in the base by the plug-in adhesive connection and can reduce a setting time. In contrast to known solutions, the bore does not permit the bolt to swim or float during curing. The setting time of the bolt therefore is limited to an application of adhesive and to an insertion or fitting of the bolt into the bore.

The second pin may have a knurled portion or a surface suitable for adhesive bonding. A flank of the knurled portion may have an angle of 20 to 40°, preferably 25 to 35°. The acute-angle formation of the knurled portion therefore the second pin with a relatively large surface. A loadable, integrally bonded connection can be produced between the bolt and the base material during the adhesive bonding of the second pin of the bolt to the bore of the base material.

The flank of the second pin may have a first limb substantially parallel to the flange and a second limb oblique to the flange. The second pin preferably is cylindrical, and the flank in the region of the first limb has a larger diameter than in the region of the second limb. The second limb may extend in a direction facing away from the flange.

Formation of the flanks of the second pin with first limbs formed substantially parallel to the flange and second limbs formed oblique to the flange enables the bolt fit into the bore of the base material for an adhesive to be transported by the flanks into an inner region of the bore.

The flange may be cylindrical, and a cylindrical section may be formed concentrically on the second side of the flange. The cylindrical section preferably has a smaller diameter than the flange. Thus, an adhesive gap is formed between a circumferential section of the cylindrical section and a circumferential section of the flange when the flange contacts the base material. Of course, the adhesive gap may be realized in another manner and, for example, depending on the manufacturing, may be realized by a spacer stud or a cross recess. Adhesive in the adhesive gap enables an integrally bonded connection between the bolt and the base material.

The cylindrical section may have a thickness of 0.2 mm to 0.4 mm, preferably of 0.25 mm to 0.35 mm. This thickness permits an integrally bonded connection between the bolt and the base material when the adhesive is applied.

The bolt may be formed from stainless steel, a coated steel or aluminum or from a fiber-reinforced plastic. The stainless steel bolt avoids contact corrosion between the bolt and base material. A fiber-reinforced plastic bolt advantageously can be produced as an injection molded part.

The invention also relates to a method for fastening a bolt to a base material. The method comprises introducing a bore into the base material, applying an adhesive in the region of a border of the bore and fitting the bolt into the bore. The bolt has a flange. A first pin is formed on a first side of the flange and is provided with a thread, and a second pin formed on a second side of the flange. The second pin of the bolt advantageously is fit into the bore by means of a plug-in adhesive connection. Using the plug-in adhesive connection to fix the second pin on the second side of the flange in the bore formed in the base material reduces a setting time. The bore prevents the bolt from swimming during curing. The setting time of the bolt therefore is limited to an application of adhesive and an insertion or fitting the bolt into the bore.

The method may further include applying adhesive to a knurled portion on the second pin. Flanks of the knurled portion transport the adhesive from the border of the bore onto an inner region of the bore. The adhesive provides an integrally bonded connection between the second pin and the bore.

The method may further include displacing adhesive from a border of the bore into an adhesive gap when a cylindrical section formed concentrically on the second side of the flange makes contact with the base material. The cylindrical section preferably has a smaller diameter than the flange. The adhesive in the adhesive gap ensures an integrally bonded connection between the bolt and the base material.

The method may include using a single- or two-component adhesive. A curing time of the adhesive can be reduced as a result.

The method may include introducing the bore into the base material by a CNC device to achieve more accurate positioning of the bore on the base material.

The invention also provides a bolt arrangement for fastening a component to a base material. The bolt arrangement has the above-described bolt and a base material. The second pin of the bolt is secured by a plug-in adhesive connection into a bore formed in the base material.

Forming a bore in the base material enables the bolt to be positioned more accurately on the base material in contrast to the use of a template. The second pin on the second side of the flange can be secured in the bore in the base material by the plug-in adhesive connection, thereby reducing a setting time. The bore prevents the bolt from swimming during a curing operation. The setting time of the bolt therefore is limited to an application of adhesive and to an insertion or fitting of the bolt into the bore.

The second pin of the bolt may be fitted into the bore by means of an interference fit. This additional interlocking connection advantageously increases the load-bearing capacity of the bolt with respect to bending and shearing forces.

The base material may be formed by a carbon-fiber-reinforced plastic. The second pin formed on the second side of the flange is fit into the bore of the base material. The bolt is therefore insensitive to small unevenness that may occur on the unmold side of laminar components.

The base material may be formed by a body component or a composite fiber component of a motor vehicle. The plug-in adhesive connection of the bolt to the base material can therefore provide a stronger connection to the base material with respect to shearing and bending forces of the bolt.

Exemplary embodiments of the invention are illustrated in the figures of the drawings and are explained in more detail in the description below.

DETAILED DESCRIPTION OF THE PREFERRED EMBODIMENTS

Figure 1:
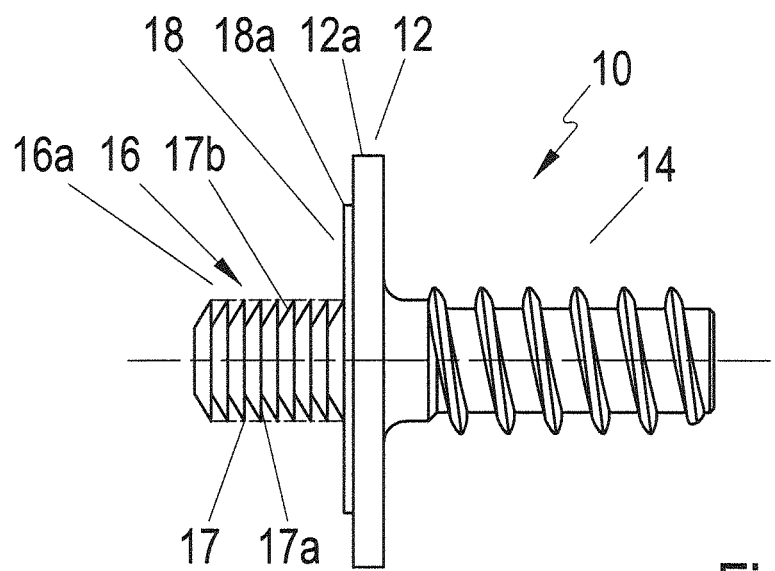
FIG. 1 is a schematic illustration of a bolt for fastening a component to a base material according to a preferred exemplary embodiment.

FIG. 1 shows a schematic illustration of a bolt for fastening a component to a base material according to a preferred exemplary embodiment.

The bolt 10 has a flange 12, a first pin 14 and a second pin 16.

The flange 12 preferably is cylindrical and supports the component that is to be fastened to the bolt. The first pin 14 is perpendicular to the flange 12 on a first side of the flange 12 and has a thread, which in this embodiment is a coarse thread. Other suitable threads, for example a symmetrical thread or a pine-tree thread are possible.

The second pin 16 extends perpendicularly from a second side of the flange 12. The second pin 16 has a knurled portion 16a and a flank 17 of the knurled portion 16a has an angle of 30°. However, the angle of the respective flank may alternatively likewise be within a range of 20° to 40°.

The respective flank 17 of the second pin 16 has a first limb 17a formed substantially parallel to the flange and a second limb 17b oblique to the flange 12. The second pin 16 is cylindrical, and the respective flank has a larger diameter in the region of the first limb 17a than in the region of the second limb 17b. The second limb 17b extends in a direction facing away into the flange.

A cylindrical section 18 is formed concentrically with the flange 12 and is on the second side of the flange 12. The cylindrical section 18 has a smaller diameter than the flange 12. As a result, an adhesive gap is defined when the flange 12 of the bolt 10 makes contact with the base material 20, provided.

The cylindrical section 18 and the adhesive gap provided by the cylindrical section 18 has a thickness of 0.3 mm. Alternatively, the cylindrical section 18 can have a thickness within the range of 0.2 mm to 0.4 mm. The bolt is preferably formed from stainless steel or a fiber-reinforced plastic.

Figure 2:
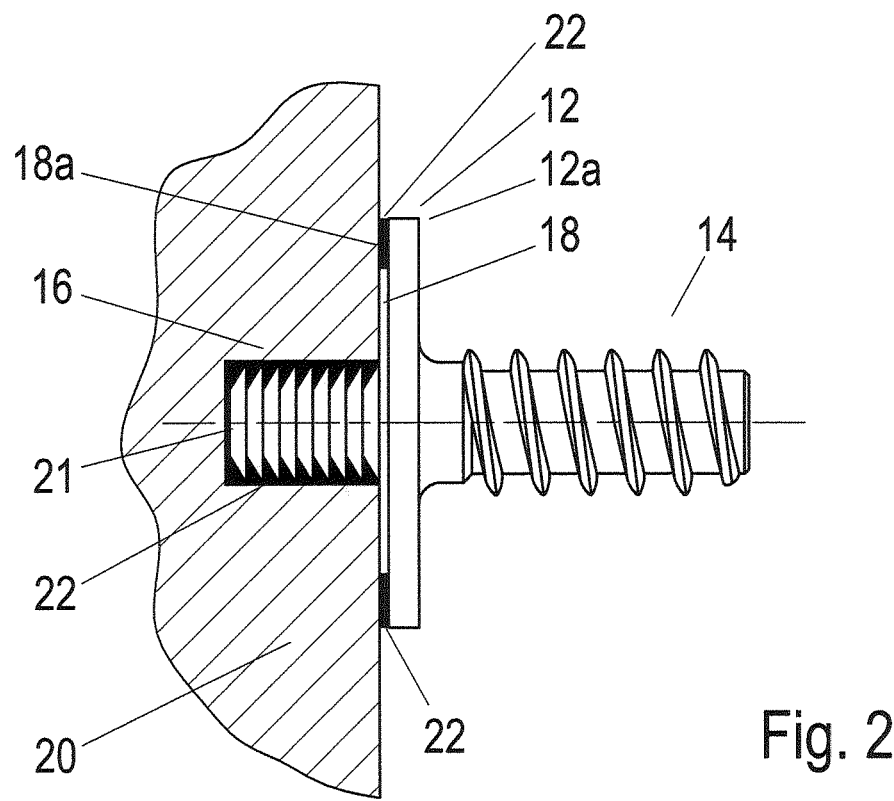
FIG. 2 is a schematic illustration of a bolt arrangement for fastening a component to a base material according to a preferred exemplary embodiment.

FIG. 2 shows a bolt arrangement for fastening a component to a base material 20 according to a preferred exemplary embodiment.

The bolt arrangement comprises the bolt 10 and the base material 20. According to the illustration of FIG. 2, the second pin 16 of the bolt 10 is fit by a plug-in adhesive connection into a bore 21 formed in the base material 20.

The second pin 16 of the bolt 10 preferably is fit into the bore 21 by means of an interference fit. The base material 20 is formed by a carbon-fiber-reinforced plastic and preferably is a body component or a composite fiber component of a motor vehicle.

The fastening of the bolt 10 to the base material 20 preferably comprises forming the bore 21 in the base material 20, applying an adhesive 22 to the base material 20 in the region of a border of the bore 21, and inserting the second pin 16 of the bolt into the bore 21 until the cylindrical section 18 contacts the base material 20.

When the bolt 10 is fit into the bore 21, the second pin 16 is designed in such a manner that the knurled portion 16a formed on the second pin 16 fits at least some of the adhesive 22 applied in the region of the border of the bore 21 into the bore 21 at the same time.

After the cylindrical section 18 of the bolt 10 makes contact with the base material 20, the adhesive 22 applied in the region of the border of the bore 21 is displaced so that the adhesive 22 is arranged in an adhesive gap between a circumferential section 18a of the cylindrical section 18 formed concentrically on the flange 12 on the second side of the flange 12 and a circumferential section 12a of the cylindrical flange 12. The cylindrical section 18 has a smaller diameter than the flange 12. The adhesive 22 preferably is a two-component adhesive. The bore 21 advantageously is introduced into the base material 20 by a CNC device.

The invention is not restricted to the above exemplary embodiment. Within the scope of protection, the bolt of the invention, the method of the invention and the bolt arrangement of the invention for fastening a component to a base material may take on a different embodiment to the one specifically described above. For example, different types of flange shapes are conceivable, for example the flange may have a curvature to be supported on a base material with a corresponding curvature to provide a supporting surface of the flange on the base material.

What is claimed is:

1. A bolt for fastening a component to a base material, comprising:
   a flange for supporting the component, the flange having opposite first and second surfaces and an outer periphery extending between the first and second surfaces, a cylindrical section projecting from the second surface and having an outer circumference spaced inward from the outer periphery of the flange;
   a first pin projecting from the first surface of the flange and provided with a thread; and
   a second pin projecting from the second surface of the flange and configured to be fit into a bore in the base material, the second pin having a plurality of annular protrusions, each of the annular protrusions having a first surface facing the flange and substantially parallel to the flange and a second surface facing obliquely away from to the flange, the second pin being fittable by a plug-in adhesive connection into the bore formed in the base material.

2. The bolt of claim 1, wherein the first and second surfaces of each of the annular protrusions intersecting at an angle of 20° to 40°.

3. The bolt of claim 1, wherein the flange is cylindrical, and the cylindrical section is formed concentrically with the flange.

4. The bolt of claim 3, wherein the cylindrical section has a thickness of 0.2 mm to 0.4 mm.

5. The bolt of claim 1, wherein the bolt is formed from stainless steel or from a fiber-reinforced plastic.

6. A method for fastening a bolt to a base material, comprising:
    forming a bore into the base material;
    applying an adhesive in a region of a border of the bore;
    providing a bolt having a flange having opposite first and second surfaces and an outer periphery extending between the first and second surfaces, a cylindrical section projecting from the second surface and having an outer circumference spaced inward from the outer periphery of the flange, a first pin projecting from the first surface of the flange and formed with a thread, and a second pin projecting from the second surface of the flange, the second pin having a plurality of annular protrusions, each of the annular protrusions having a first surface facing the flange and substantially parallel to the flange and a second surface facing obliquely away from to the flange; and
    fitting the second pin of the bolt into the bore to achieve a plug-in adhesive connection so that the second pin transports at least some of the adhesive from the region of the border of the bore into the bore as the second pin is fit into the bore and displacing at least some of the adhesive from the region of the border of the bore into an adhesive gap adjacent an outer circumference of the cylindrical section and the second surface of the flange outward of the cylindrical section.

7. The method of claim 6, wherein the adhesive is a two-component adhesive.

8. The method of claim 6, wherein the step of forming the bore in the base material comprises using a CNC device.

9. A bolt arrangement for fastening a component to a base material, comprising:
    a bolt having a flange, the flange having opposite first and second surfaces and an outer periphery extending between the first and second surfaces, a cylindrical section projecting from the second surface and having an outer circumference spaced inward from the outer periphery of the flange, a first pin projecting from the first surface of the flange and provided with a thread, and a second pin projecting from the second surface of the flange, the second pin having a plurality of annular protrusions, each of the annular protrusions having a first surface facing the flange and substantially parallel to the flange and a second surface facing obliquely away from to the flange; and
    a base material having a bore and a surface outward of the bore;
    the second pin being fit in the bore and secured by a plug-in adhesive connection adjacent the first and second surfaces of each of the annular protrusions, a portion of the adhesive being between the surface of the base material and the second surface of the flange outward of the cylindrical section.

10. The bolt arrangement of claim 9, wherein the second pin of the bolt is fit into the bore by an interference fit.

11. The bolt arrangement of claim 9, wherein the base material is a carbon-fiber-reinforced plastic.

12. The bolt arrangement of claim 11, wherein the base material is a body component of a motor vehicle.

* * * * *